US009876359B2

(12) United States Patent
Wang (10) Patent No.: US 9,876,359 B2
(45) Date of Patent: Jan. 23, 2018

(54) HIGH-VOLTAGE INTELLIGENT SWITCH ALTERNATING CURRENT CAPACITOR

(71) Applicant: GYRK INTERNATIONAL TECHNOLOGY CO., LTD., Beijing (CN)

(72) Inventor: Hai Wang, Beijing (CN)

(73) Assignee: GYRK INTERNATIONAL TECHNOLOGY CO., LTD. (CN)

( * ) Notice: Subject to any disclaimer, the term of this patent is extended or adjusted under 35 U.S.C. 154(b) by 0 days.

(21) Appl. No.: 15/116,892

(22) PCT Filed: Feb. 5, 2015

(86) PCT No.: PCT/CN2015/072268
§ 371 (c)(1),
(2) Date: Aug. 5, 2016

(87) PCT Pub. No.: WO2015/117557
PCT Pub. Date: Aug. 13, 2015

(65) Prior Publication Data
US 2017/0179721 A1 Jun. 22, 2017

(30) Foreign Application Priority Data
Feb. 8, 2014 (CN) .......................... 2014 1 0046598

(51) Int. Cl.
*H02J 3/18* (2006.01)
*H01G 4/255* (2006.01)
*H01G 4/258* (2006.01)

(52) U.S. Cl.
CPC .......... *H02J 3/1807* (2013.01); *H01G 4/255* (2013.01); *H01G 4/258* (2013.01); *Y02E 40/30* (2013.01)

(58) Field of Classification Search
CPC ........ H02J 3/1807; H01G 4/258; H01G 4/255
See application file for complete search history.

(56) References Cited

U.S. PATENT DOCUMENTS 8,724,353 B1 * 5/2014 Giuliano ................. H02M 3/07
327/536
2003/0184926 A1 * 10/2003 Wu ......................... H01H 9/542
361/2

FOREIGN PATENT DOCUMENTS

| CN | 201860115 | 6/2011 |
|---|---|---|
| CN | 202058591 | 11/2011 |
| CN | 102412584 | 1/2012 |
| CN | 202633950 | 12/2012 |
| CN | 203103979 | 7/2013 |

* cited by examiner

*Primary Examiner* — Emily P Pham
(74) *Attorney, Agent, or Firm* — Barnes & Thornburg LLP; Jeffrey R. Stone (57) ABSTRACT

Disclosed is a high-voltage AC capacitor for reactive power compensation of 10 kV-35 kV power grid, and in particular to a high-voltage AC capacitor with a high-voltage switching switch provided therein, as well as a structure for prolonging the service life of a thin film metalized high-voltage capacitor and a control method for prolonging the service life of the thin film metalized high-voltage capacitor. The AC capacitor is formed by multiple intelligent switch capacitor units connected in series, and each capacitor unit is formed by a switch contact (K11-Kn1) and a capacitor (C1-Cn) connected in series. If there are N capacitor units, when each switch contact is disconnected, the endurable voltage of each switch contact, the endurable voltage between the switch contact and a coil and the voltage each capacitor withstands are 1/Nth of the total voltage; when the switch operates, all the contacts operate at the same instant.

20 Claims, 12 Drawing Sheets

FIG.1

(Prior Art)

HIGH-VOLTAGE INTELLIGENT SWITCH ALTERNATING CURRENT CAPACITOR

TECHNICAL FIELD

The present disclosure relates to a high-voltage capacitor for reactive power compensation of 10 kV-35 kV power grid, in particular to a combination of a high-voltage fling-cut switch and a high-voltage alternating current (AC) capacitor.

TECHNICAL BACKGROUND

Power equipments in a power system mainly are inductive equipments. Low power factors lead to serious line loss. In order to ensure an economic operation of a power grid, there is a parallel capacitor compensation device equipped to a main load side (10 kV or 35 kV) of each transformer substation of respective voltage grade. Positive reactive power produced by a perceptual device in the power grid constantly changes, so that negative reactive power produced by a corresponding compensation capacitor would also change correspondingly. Because it is easier to switch a reactor in a manner of fling-cut switching rather than to switch a capacitor, a capacitor is generally adopted to generate a static negative reactive power so as to adjust change of reactive power using a method of switching a reactor in a manner of fling-cut switching or adjusting a saturated electronic controller, which apparently causes complexity of a reactive power compensation equipment. Using a thyristor as a fling-cut switch can solve a fling-cut switching problem of a capacitor (a SVC technology); and although thyristor fling-cut switching can avoid an inrush current during capacitor fling-cut switching, the capacitor fling-cut switching has a defect of high power consumption and high cost. At present, in an occasion that a frequency of the capacitor fling-cut switching is not high, a commonly adopted manner is to adopt vacuum circuit breaker for fling-cut switching; however, the vacuum circuit breaker cannot avoid an inrush current during fling-cut switching. A thyristor fling-cut switch would be turned on by mistake when a dv/dt is very large, so that a vacuum circuit breaker would produce an inrush current during fling-cut switching. To solve such a problem, series reactors are generally adopted to suppress surge voltage and surge current, which will increase cost of a compensation device. A Chinese patent application No. 201110034379.4 has disclosed a high-voltage electronic arc extinguishing switch, which is formed of a plurality of switch contacts in series; however, this application requires that a withstand voltage between each relay contact and control coils should be over a controlled total voltage, which places great demands on insulation between contacts of a relay and coils.

Figure 1:
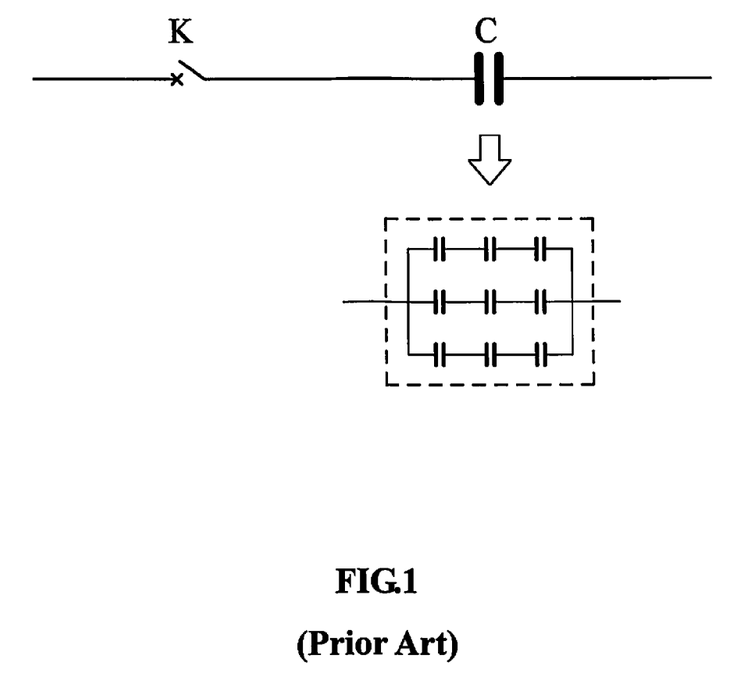
FIG. 1 is a schematic diagram showing a traditional high-voltage switch and high-voltage capacitor fling-cut circuit.

When a high-voltage capacitor performs a reactive power compensation task, a high-voltage capacitor as a reactive load has to be connected to a power grid with a high-voltage switch. An existing high-voltage capacitor and high-voltage switch are two separate components, as shown in FIG. 1, where the high-voltage capacitor is generally composed of a plurality of capacitor core packages in series or parallel, the high-voltage switch is a switch having a single contact, and one high-voltage switch controls one high-voltage capacitor, or a plurality of series or parallel high-voltage capacitor. For security reasons regarding a high-voltage AC capacitor, many detection and protection devices for capacitor are generally installed in a compensation equipment; however, these detection and protection devices are external and are unable to detect operating situations inside the capacitor, thus so-called protection is lagging and inaccurate.

For security reasons regarding a traditional high-voltage capacitor, discharging devices must be arranged in parallel at both ends of the capacitor. Although there is a low cost due to use of discharging resistor, a great power consumption would occur. Therefore, a discharging coil with high cost is generally connected to both ends of an AC capacitor in parallel; however, the discharging coil would also produce certain power consumption during operation of a compensation capacitor.

Even though a capacitor for reactive power compensation on a power grid, and a fling-cut switch are always used together, but they always appear as two components, which increases not only hidden danger due to poor connection between the two components, but also cost of the two components. In addition, it is not easy for actual designers and users of a reactive power compensation capacitor to select a proper fling-cut switch, since different capacitors in use need to be coordinated with different fling-cut switches.

A high-voltage capacitor is formed of a plurality of low-voltage capacitor core packages in series, and a traditional high-voltage capacitor is formed of gold foil capacitor core packages in series. Capacitor core packages produced by a thin film metalizing process are widely used in a low-voltage field due to advantages of cost and environmental protection; however, capacitor core packages produced by the thin film metalizing process cannot be used in a field of high-voltage capacitors since a thin film metalized capacitor in use continually decays in capacity, and a capacitor core package decayed in capacity would further accelerate decay in capacity due to increasing of a partial pressure if thin film metalized capacitors are connected in series, so that lives of thin film metalized capacitor core packages connected in series in a high-voltage capacitor are short.

SUMMARY

A purpose of this disclosure is to provide a high-voltage AC capacitor principle circuit with a high-voltage intelligent switch, as well as an intelligent switch high-voltage compensation capacitor structure manufactured according to the principle. The high-voltage intelligent switch applied for fling-cut switching the high-voltage AC capacitor is an ideal fling-cut switch of the high-voltage AC capacitor, which can rapidly fling-cut switching the capacitor by conveniently controlling the high-voltage intelligent switch in the high-voltage capacitor, so that sparking or arcing, and inrush current or over voltage would not occur during fling-cut switching process of the high-voltage intelligent switch. In addition, the built-in high-voltage intelligent switch contains many kinds of protection measures to protect the high-voltage AC capacitor. When the capacitor is over heated, over current, or over voltage, the high-voltage intelligent switch will disconnect the capacitor to protect the capacitor. Consumption of the switch is much lower than that of a thyristor fling-cut switch or a vacuum circuit breaker switch, and fling-cut speed of the switch is equivalent to that of a thyristor fling-cut switch; however, reliability of the switch is greatly higher than that of a thyristor switch, and cost of the switch is greatly lower than that of a thyristor switch. The high-voltage intelligent switch AC capacitor of the present disclosure has a built-in discharge unit, and the discharge unit almost produces no power consumption during operating of the capacitor. By using the high-voltage compensation capacitor principle circuit of the intelligent switch provided by the present disclosure, an intelligent switch AC capacitor with extra high-voltage and ultra high-voltage can be produced, so as to realize compensation of extra high-voltage or ultra high-voltage.

The purpose of this disclosure is realized by following technical solutions.

A high-voltage intelligent switch AC capacitor, including a high-voltage intelligent switch and a high-voltage AC capacitor, where the high-voltage intelligent switch and the high-voltage AC capacitor are formed of a plurality of intelligent switch capacitor units connected in series, and have a control end for controlling the high-voltage intelligent switch; the intelligent switch capacitor unit is composed of an intelligent switch control module, a relay switch, and an AC capacitor, where contacts of the relay switch are connected with the capacitor in series, and the intelligent switch control module is connected to both ends of a series circuit of the contacts of the relay switch and the capacitor.

Further, the intelligent switch control module is composed of a power supply module, an intelligent switch control circuit, a switch contact protection circuit, a low-voltage end communication module, a high-voltage end communication module, a temperature sensor, a current detection module, a voltage detection module and a capacitor discharging module.

Further, the power supply module is a capacitance step-down rectification voltage stabilizing power supply.

Further, the relay in the intelligent switch capacitor unit is a magnetic latching relay.

Further, after a control port of the high-voltage intelligent switch AC capacitor receives a switch-on instruction, the switch-on instruction will be transmitted to all intelligent switch capacitor units through the high-voltage end communication module and low-voltage end communication module in each intelligent switch capacitor unit, and switches of all the intelligent switch capacitor units are turned on at a same time; and when the control port receives a switch-off instruction, switches of all the intelligent switch capacitor units are turned off at a same time.

Further, a temperature sensor is arranged in the intelligent switch capacitor unit, and is configured to detect temperature of capacitor core packages; a current detector is provided in the intelligent switch capacitor unit, and is configured to detect current passing through the capacitor and harmonic components during operating of the capacitor; and a voltage detection module is arranged in the intelligent switch unit, and is configured to detect operation voltage during operating of the capacitor; when at least one intelligent switch capacitor unit detects that a temperature, current or voltage exceeds a set value, switches of all the intelligent switch capacitor unit are notified through the high and low voltage communication modules to be turned off at a same time, so as to protect the capacitor.

Further, both ends of the intelligent switch capacitor unit are connected to relay contacts in parallel, and the parallel relay is controlled by an intelligent switch control module of the present unit; a contact circuit of the parallel relay is provided with a current mutual inductor, and when the parallel relay contacts short out the present intelligent switch capacitor unit, the current mutual inductor provides power to the intelligent switch control module of the present unit.

Further, a capacitor in the intelligent switch capacitor unit is composed of a plurality of thin film metalized capacitor core packages connected in serial or in parallel.

Further, the intelligent switch capacitor unit has a metal housing, which is functioned as a pole of the intelligent switch capacitor unit.

Optionally, the high-voltage intelligent switch AC capacitor has a shape of cuboid or cylinder.

Beneficial effects of the present disclosure are as follows. A high-voltage AC capacitor with a switch is provided, and the switch and the high-voltage capacitor are integrally formed into a new circuit element, so as to reduce volume compared to the original two circuit elements, cost is reduced, and reliability is improved. By multiple low-voltage intelligent switches in series, a problem that air contact switches cannot be connected in series to form a high-voltage switch is successfully solved, so that a high-voltage switch is achieved by low cost switches, and sparking or arcing of contacts would not occur during turn-on or turn-off of a switch compared to a traditional high-voltage switch, which improves electrical life of switch contacts, and more importantly, no harmonic pollution of power grid would be produced. An intelligent switch control module further provides many kinds of protection measures for the capacitor, so as to ensure that the capacitor is timely protected when the capacitor is over heated, over current, or over voltage.

REFERENCE SIGNS a: Capacitor end of high-voltage intelligent switch capacitor; b: Switch end of high-voltage intelligent switch capacitor; c: Control end of high-voltage intelligent switch capacitor; 1: Housing of capacitor unit of intelligent switch; 2: Low-voltage end communication interface; 3: High-voltage end communication interface; 4: Capacitor end of capacitor unit of intelligent switch; 5: Switch end of capacitor unit of intelligent switch; 6: Control module of intelligent switch; 7: Capacitor core package; 8: Polypropylene thin film layer; 9: Insulating oil; 10: Power supply module; 11: Intelligent switch control circuit; 12: Low-voltage end communication module; 13: High-voltage end communication module; 14: Temperature sensor; 15: Current detecting module; 16: Voltage detection module; 17: Capacitor discharging module; 18: Insulating support plate; 19: Infrared receiver; 20: Infrared emission diode.

DETAILED DESCRIPTION OF EMBODIMENTS

Figure 2:
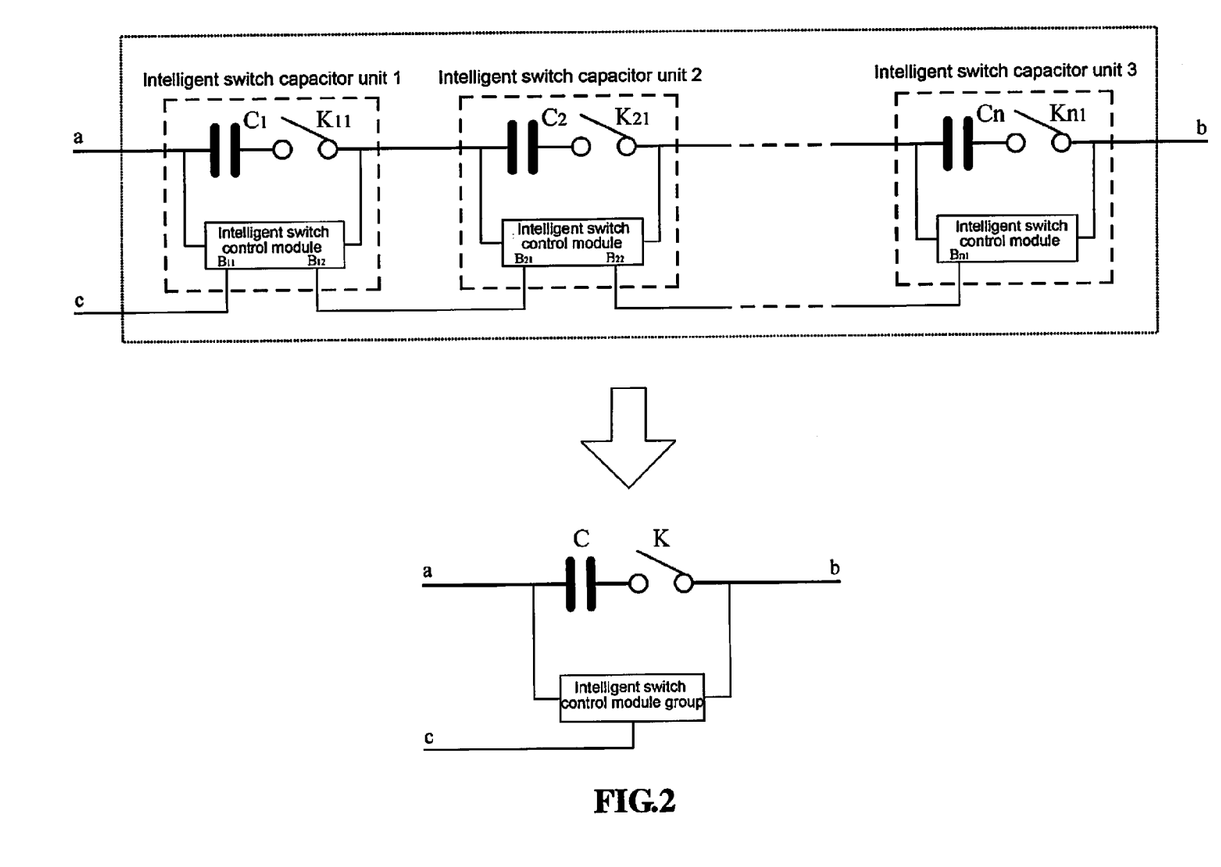
FIG. 2 is a schematic structural diagram showing a circuit of a high-voltage intelligent switch AC capacitor of the disclosure.

A high-voltage intelligent switch AC capacitor of the present disclosure is a new type of circuit element that contains a high-voltage intelligent switch and a high-voltage AC capacitor, and has a control end c capable of controlling operations of a high-voltage switch K, as shown in FIG. 2. A intelligent switch capacitor unit is composed of an intelligent switch control module, a relay switch and an AC capacitor, where a contact of the relay switch is connected with the capacitor in series, and the intelligent switch control module is connected to both ends of the series circuit including the contact of the relay switch and the capacitor, and the intelligent switch control module has a high-voltage end communication interface and a low-voltage end communication interface. A specific series mode of intelligent switch capacitor units is shown in FIG. 2, usually a capacitor end of a high-voltage intelligent switch capacitor is connected to a low-voltage end of a power grid, and a switch end of the high-voltage intelligent switch capacitor is connected to a high-voltage end of the power grid, therefore communication interfaces of the intelligent switch capacitor unit is classified into a high-voltage end and a low-voltage end. An equivalent circuit of intelligent switch capacitor units in series is basically as same as the traditional high-voltage switch and high-voltage capacitor fling-cut switching circuit shown as FIG. 1, they have a same circuit function, but the equivalent circuit has an equivalent intelligent switch control module group in parallel at both ends of a switch K and a capacitor C. A function of communication ports B11-Bn1 on the intelligent switch control module is to transfer switch control signals and operation states of various capacitors. When a switch-on signal is applied to a control end c of the high-voltage intelligent switch capacitor, the switch-on signal is received by the communication port B11 of an intelligent switch capacitor unit 1, then the switch-on signal will be transferred to a communication port B21 of an intelligent switch capacitor unit 2 through a communication port B12; and by relaying like this, the switch-on signal is transferred to a communication port Bn1 of a final intelligent switch capacitor unit n. Switches K11 to Kn1 are turned on at a same time under control of respective intelligent switch control module, so that capacitors C1 to Cn in series are connected into the power grid. Similarly, when a switch-off signal transmitted from the control end c is received by the communication port B11 of the intelligent switch capacitor unit 1, the switch-off signal will be transmitted to the communication port B21 of the intelligent switch capacitor unit 2 through the communication port B12; and by relaying like this, the switch-off signal is transferred to the communication port Bn1 of the final intelligent switch capacitor unit n. Switches K11 to Kn1 are turned off at a same, and capacitors C1 to Cn are disconnect from the power grid. In the high-voltage intelligent switch, all switch contacts in series are connected or disconnected at a same time, and a zero current point can be automatically found, so that sparks during switch-on and arcing during switch-off of contacts are avoid.

Figure 3:
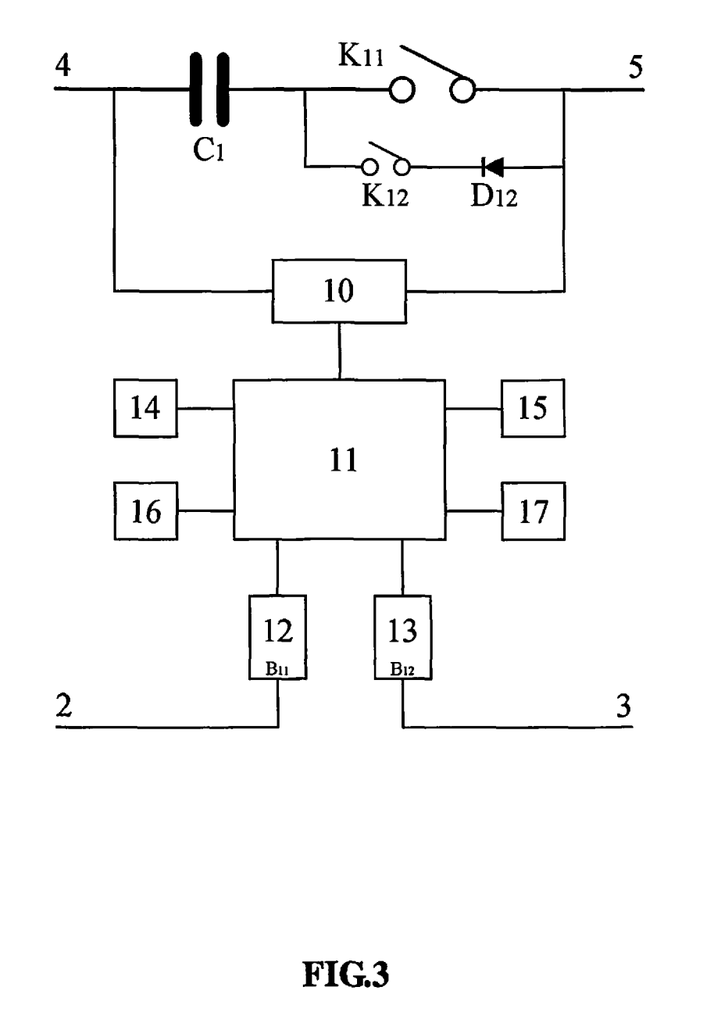
FIG. 3 is a frame diagram showing a control module of the intelligent switch of embodiments in the present disclosure.

The intelligent switch control module is composed of a power supply module 10, an intelligent switch control circuit 11, a switch contact protection circuit, a low-voltage end communication module 12, a high-voltage end communication module 13, a temperature detection sensor 14, a current detection module 15, a voltage detection module 16 and a capacitor discharging module 17. FIG. 3 is a frame diagram showing a circuit of the intelligent switch capacitor unit 1. Two power supply input ends of the power supply module 10 are respectively connected to a capacitor end 4 and a switch end 5 of the intelligent switch capacitor unit. Because all intelligent switch capacitor units are connected in series, power supply modules of all intelligent switch control modules are connected in series on both ends of a high-voltage power supply regardless of whether internal switches K11 to Kn1 of each intelligent switch capacitor unit are on or off. Once switches K11 to Kn1 are off, it is equivalent that power supply modules in all intelligent switch capacitor units are connected in series. If n intelligent switch capacitor units are connected in series, voltage of each power supply modules is 1/n of a total voltage under a condition of equalizing voltage. Assuming that an operation voltage of the high-voltage intelligent switch AC capacitor is 10 kV, and the high-voltage intelligent switch AC capacitor is composed of 10 intelligent switch capacitor units, then each power supply module has a voltage of 1000V. All of the power supply modules should be ensured of equalizing voltage in order to prevent a certain power supply module from being damaged due to over voltage. Then a withstanding voltage of each switch contact is an equalizing voltage value of a corresponding power supply module. If switches K11 to Kn1 are on, it is equivalent that power supply modules of all intelligent switch capacitor units are connected in series after connected with corresponding capacitors in parallel. Equalizing voltages of various intelligent switch capacitor units are decided by capacitors C1 to Cn. The power supply module 10 supplies low-voltage direct current power to the intelligent switch control circuit 11, and supplies power to a relay switch K11 and an auxiliary relay switch K12. After receiving a switch control signal of a control end c of the high-voltage intelligent switch capacitor, the intelligent switch control circuit will control the relay switch K11 and the auxiliary relay switch K12 to turn on or off, so as to achieve fling-cut switching of the high-voltage capacitor. The temperature detection sensor 14, the current detection module 15 and the voltage detection module 16 provide information of operation temperature, operation current and operation voltage of capacitors inside the intelligent switch capacitor unit to the intelligent switch control circuit. If the operation temperature, operation current or operation voltage exceeds a set value, the intelligent switch control circuit notifies switches K11 to Kn1 of all intelligent switch capacitor units through a low-voltage end communication module 12 and a high-voltage end communication module 13 to turn off, so that the high-voltage intelligent switch capacitor will stop operating, and the high-voltage intelligent switch AC capacitor will restart to operate when a detection value is recovered to normal.

Figure 4:
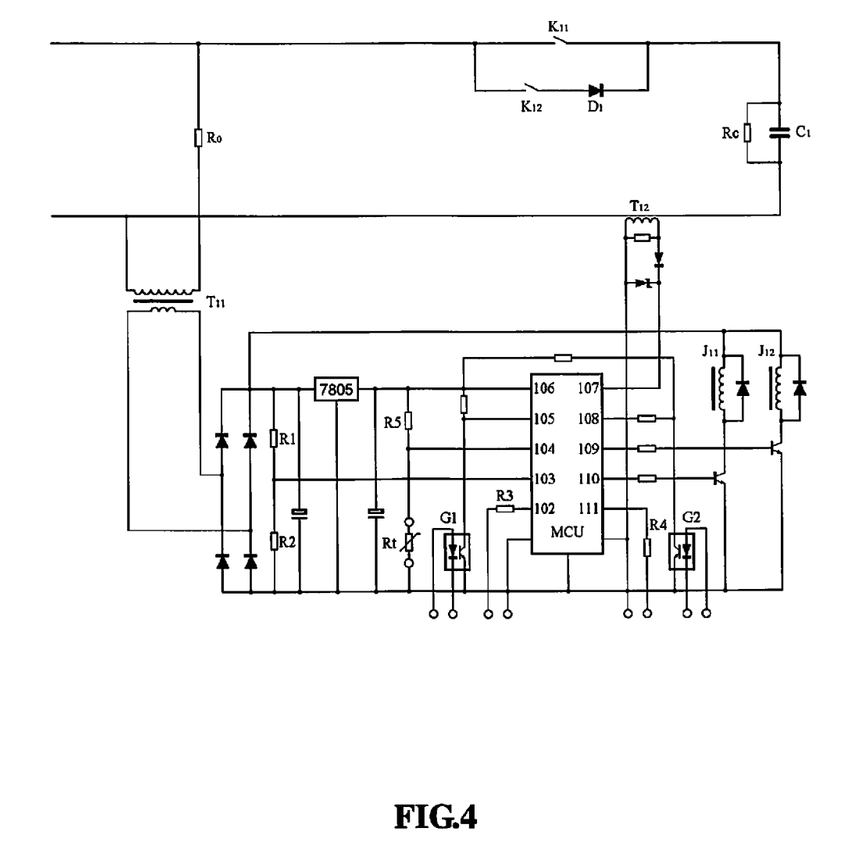
FIG. 4 is a schematic circuit diagram 1 showing an intelligent switch capacitor unit of embodiments in the present disclosure.

FIG. 4 is a schematic circuit diagram 1 showing an intelligent switch capacitor unit of embodiments in the present disclosure. A power supply of an intelligent switch control circuit and a relay is composed of a transformer T1, a bridge rectifier and a 7805 voltage regulator circuit. The R0 is an equalizing voltage adjustment resistance, an impedance of a T1 primary side can be adjusted by adjusting a resistance value of the R0, so as to achieve voltage equalizing on primary sides of all transformers in series. The intelligent switch control circuit is realized by a single chip microcomputer (MCU). Operation current information of a capacitor is collected by a current mutual inductor T2, and is provided to the single chip MCU through a port 107. Operation voltage information of a capacitor is collected by resistors R1 and R2, and is provided to the single chip MCU through a port 103. Operation temperature information of a capacitor is collected by a thermistor Rt, and is provided to the single chip MCU through a port 104. The resistor R3 and optocoupler G1 form the low-voltage end communication module. The R3 is connected to an input end of the optocoupler of the high-voltage end communication module of an intelligent switch capacitor unit at a low-voltage end, and output of the optocoupler G1 is connected to an I/O port of an high-voltage end communication end of the intelligent switch capacitor unit at a low-voltage end, so as to achieve communication of the intelligent switch capacitor unit connected with the low-voltage end in series. A resistor R4 and an optocoupler G2 form the high-voltage end communication module. The resistor R4 is connected to an input end of an optocoupler of the low-voltage communication end on an intelligent switch control module of an intelligent switch capacitor unit connected with a switch end in series. The G2 receives an output from the low-voltage communication end on the intelligent switch control unit of the intelligent switch capacitor unit connected with the switch end in series, so as to achieve communication of the intelligent switch capacitor unit connected with the high-voltage end in series. The resistor Rc is a discharging resistor of a capacitor, and releases residual charge of the capacitor C1 if the capacitor is not operating, so as to ensure that the capacitor would not subject to voltage when the capacitor is not operating, so that the capacitor is safe. The single chip used in the present embodiment is not specified with a type, and ordinary single chip designers can easily choose a single chip and achieve a circuit according to principles shown in diagrams.

Figure 5:
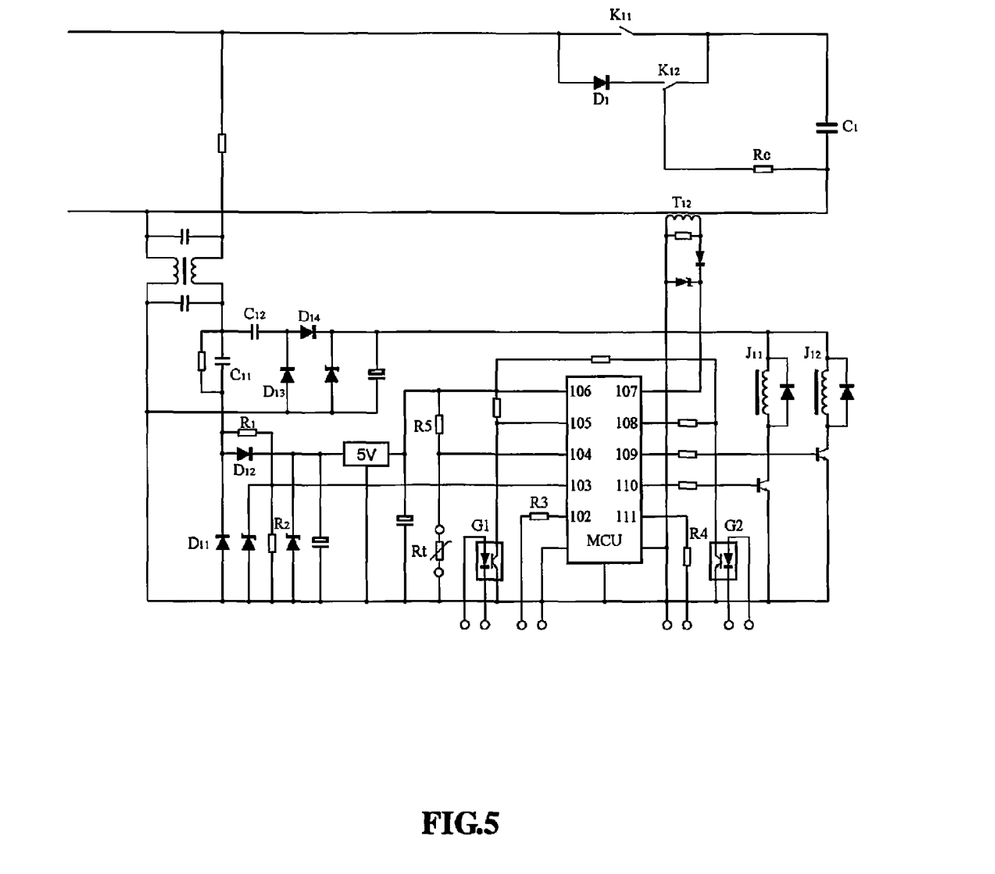
FIG. 5 is a schematic circuit diagram 2 showing an intelligent switch capacitor unit of embodiments in the present disclosure.

FIG. 5 is a schematic circuit diagram 2 showing an intelligent switch capacitor unit of embodiments in the present disclosure. The C11, D11, D12, 5 v three-end regulator and the like form a capacitance step-down voltage regulating power supply so as to provide power for the intelligent switch control circuit. The capacitance step-down power supply form of the C12, D13, D14 and the like provide power for relays J11 and J12. The J11 and J12 adopt magnetic latching relays which can greatly reduce power consumption of an intelligent switch during operating. A discharging resistor Rc is controlled by a normally closed end of the auxiliary relay J12, and the discharging resistor is disconnected when the relays J11 and J12 are on, so that power consumption of the discharging resistor can be greatly reduce. A circuit principle of the embodiment in FIG. 4 is basically as same as that in FIG. 5, and is not repeated here since it is easily understood by ordinary skilled persons.

Figure 6:
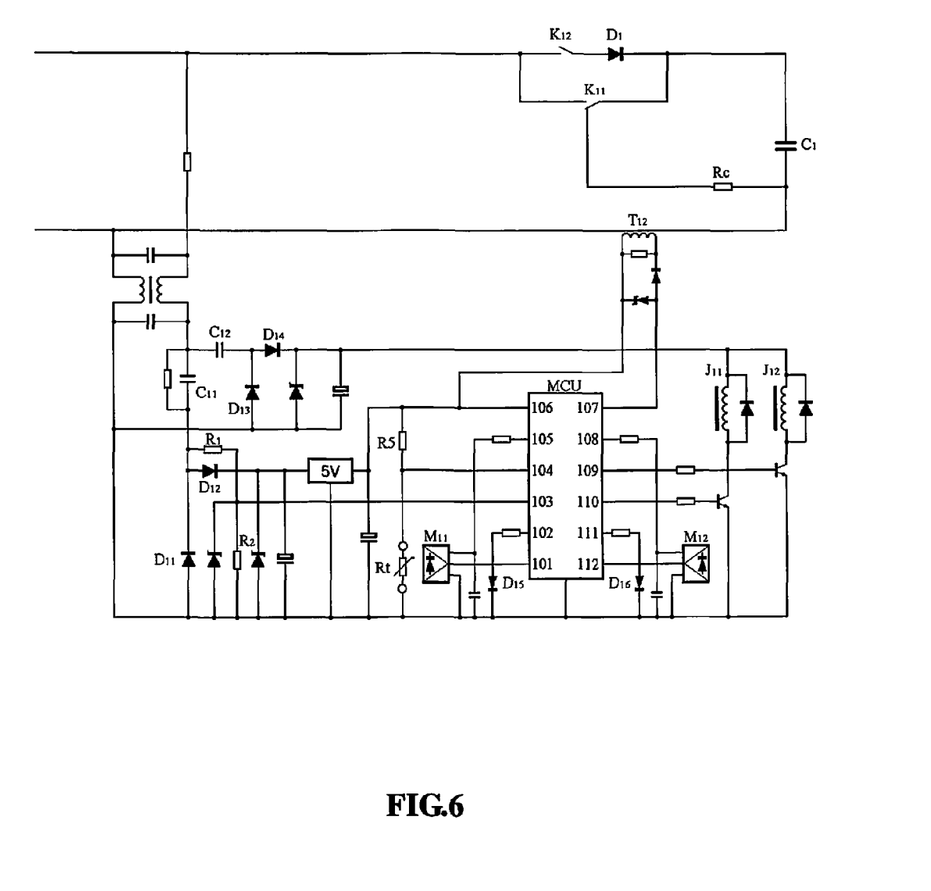
FIG. 6 is a schematic circuit diagram 3 showing an intelligent switch capacitor unit of embodiments in the present disclosure.

The low-voltage end communication module of the intelligent switch capacitor unit shown in FIG. 6 is achieved by using an infrared emitting diode D15 and an infrared receiver M11. The M11 receives signals transmitted from a low-voltage end intelligent switch capacitor unit in series. The D15 transmits signals to a low-voltage end intelligent switch capacitor unit. Similarly, an infrared emitting diode D16 and an infrared receiver M12 achieve a low-voltage end communication module. A communication mode of wireless modules such as Zigbee and Wifi communication modes can also be adopted between intelligent switch capacitor units.

Figure 7:
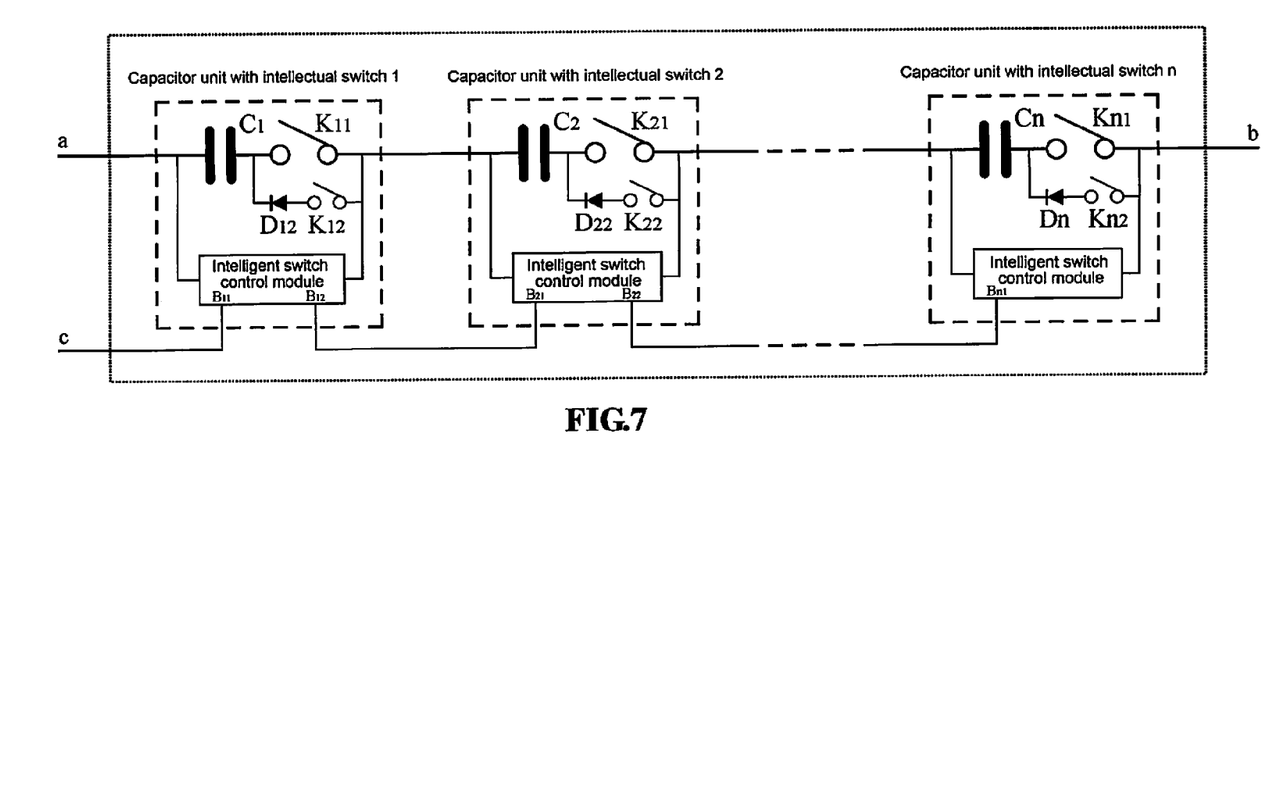
FIG. 7 is an operating diagram showing a high-voltage intelligent switch AC capacitor of embodiments in the present disclosure.

An operation principle of the high-voltage intelligent switch AC capacitor of embodiments in the present disclosure is further illustrated with reference to FIG. 7. Ends a and b of the intelligent switch high-voltage capacitor are connected to a low-voltage end and a high-voltage end of an operation power supply, and at this moment, all of the switches K11 to Kn1 and K12 to Kn2 are in an off state. Voltage of each capacitor with an intelligent switch is 1/n of total voltage. After the control end c of the intelligent switch high-voltage capacitor receives the switch-on signal, the switch-on signal is transmitted to all intelligent switch control circuits through B11 to Bn1. In a negative half cycle of AC (b represents negative and a represents positive), each intelligent switch control circuit controls all of the auxiliary switches K12 to Kn2 to be turned on, and controls all of the switches K11 to Kn1 to be turned on in a positive half cycle of AC (b represents positive and a represents negative), so that a switch-on process of switches is completed. In a switch-on process of K11 to Kn1, since each of diodes D1 to Dn is connected with each of K11 to Kn1 in parallel at both ends to protect contacts, adhering of K11 to Kn1 during sparking can be avoided, and continuous changing of current during connecting contacts of switches K11 to Kn1 is achieved, so that no inrush current occurs. When the control end c of the high-voltage intelligent switch capacitor receives the switch-off signal, the switch-off signal is transmitted to all intelligent switch control circuits through B11 to Bn1. Each intelligent switch control circuit firstly controls all auxiliary switches K12 to Kn2 to be turned on, and then controls all switches K11 to Kn1 to be turned off in a positive half cycle of AC (b represents positive and a represents negative), and each intelligent switch control circuit controls all auxiliary switches K12 to Kn2 to be turned off in a half cycle of AC (b represents negative and a represents positive), so that a switch-off process is completed. In the switch-off process of K11 to Kn1, since each of diodes D1 to Dn is connected to each of K11 to Kn1 in parallel at both ends to protect contacts, arcing of K11 to Kn1 can be avoided, and a switch-off process of switches is automatically completed by diodes in series in a moment that AC goes from positive to negative. Before the AC goes to negative, current continuously changes according to sine. When switches are turned on and the capacitor operates, once any intelligent switch capacitor unit detects over temperature, over voltage or over current, the intelligent switch control circuit of the present capacitor unit will notify through the high-voltage end communication module and the low-voltage end communication module to all switches K11 to Kn1 to be turned off, so as to protect the capacitor. A switch-off process is as same as that of the aforementioned controlled switch-off process, and is not repeated here.

Figure 8:
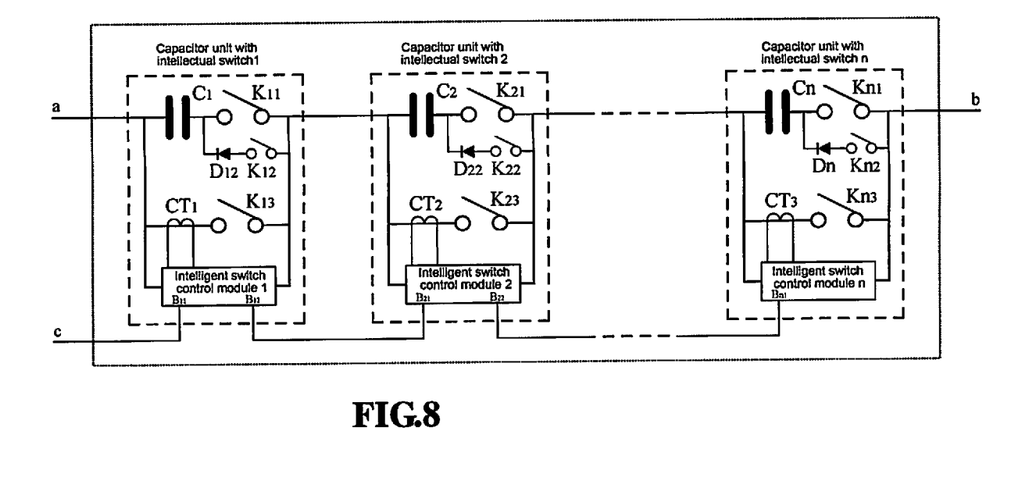
FIG. 8 is a schematic circuit diagram showing a thin film metalized high-voltage intelligent switch AC capacitor of embodiments in the present disclosure.

If thin film metalized capacitor core packages in series are used for forming a capacitor, the connection structure of switches and capacitor core packages shown in FIG. 8 is used. FIG. 8 is different from FIG. 7 in structure that there are one more of parallel relay switch contacts K13, K23 . . . Kn3 at both ends of each intelligent switch capacitor unit, and current mutual inductors CT1, CT2 . . . CTn are respectively disposed at relay contact circuits. Theses relay switch contacts play a role that switch contacts can be connected so as to short out the intelligent switch capacitor unit when capacitor core packages where the relay switch contacts locates subject to high voltage due to great reduction of capacity, so as to prevent the capacitor from being burnt down. The current mutual inductor CT plays a role that power is supplied to the intelligent switch control module in the present unit after the intelligent switch capacitor unit is short out, and on another hand, current of a whole high-voltage capacitor series circuit can be detected. The high-voltage capacitor formed of capacitor core packages in series by a thin film metalized process has a capacity continuously reducing in use due to a self-healing action of a metalized capacitor. After capacity of a certain capacitor core package reduces, a partial voltage of the capacitor core package increases, and increasing of the partial voltage makes the self-healing action stronger so that the capacity will further reduce. If a process including self-healing, capacity reducing, partial voltage increasing, stronger self-healing, further capacity reducing is allowed, then this capacitor core package would short out soon, so that the whole capacitor would be destroyed. The above vicious circle can be prevented by using the circuit structure shown in FIG. 8, and the high-voltage intelligent switch capacitor shown in FIG. 8 is composed of N intelligent switch capacitor units, and one of the N intelligent switch capacitor units is short out by a relay switch contact connected in parallel at both ends of the unit, that is to say, the high-voltage intelligent switch capacitor is composed of N−1 capacitor core packages in series during normal operating. During operating of the capacitor, fast capacity reducing of a certain capacitor core package due to certain reason would make the capacitor core package subject to higher voltage compared to other capacitor core packages. Voltage of each capacitor core package can be detected by an intelligent switch control module of the unit and transmitted to an external controller. After comparing voltage of each intelligent switch capacitor unit, the controller can decide to short out an intelligent switch capacitor unit having a highest voltage and open the originally short-out intelligent switch capacitor unit. The high-voltage intelligent switch capacitor is still composed of N−1 capacitor core packages in series, and a vicious circle of capacity reducing of certain capacitor due to a self-healing action is avoided. After a capacitor operates for a period of time, this intelligent switch capacitor unit can be short out and the intelligent switch capacitor unit which is short out before is enabled when a vicious circle of capacity reducing of another capacitor core package occurs, so that operating life and reliability of the high-voltage capacitor connected by thin film metalizing capacitor core packages in series. A intelligent switch capacitor having a higher operation voltage can make N−2 or N−3 intelligent switch capacitor units in series operate, so as to ensure higher reliability of the high-voltage intelligent switch capacitor.

Figure 9:
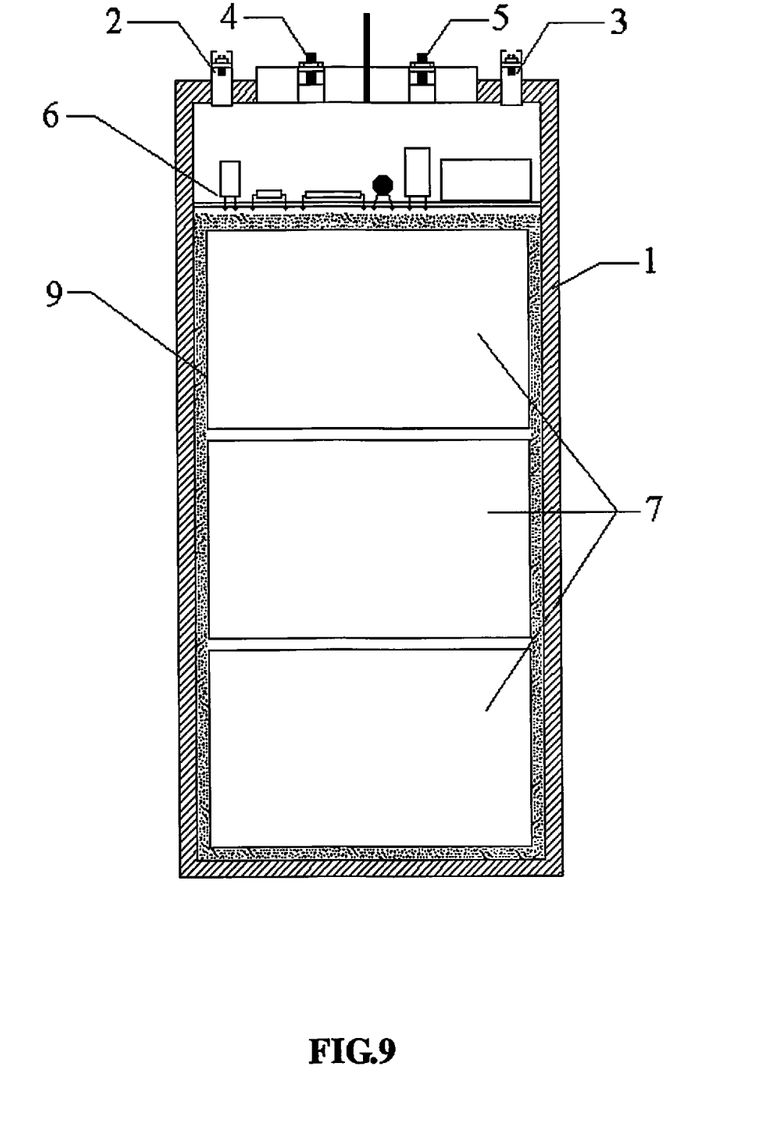
FIG. 9 is a structural diagram 1 showing internal of a capacitor unit of an intelligent switch of embodiments in the present disclosure.
Figure 10:
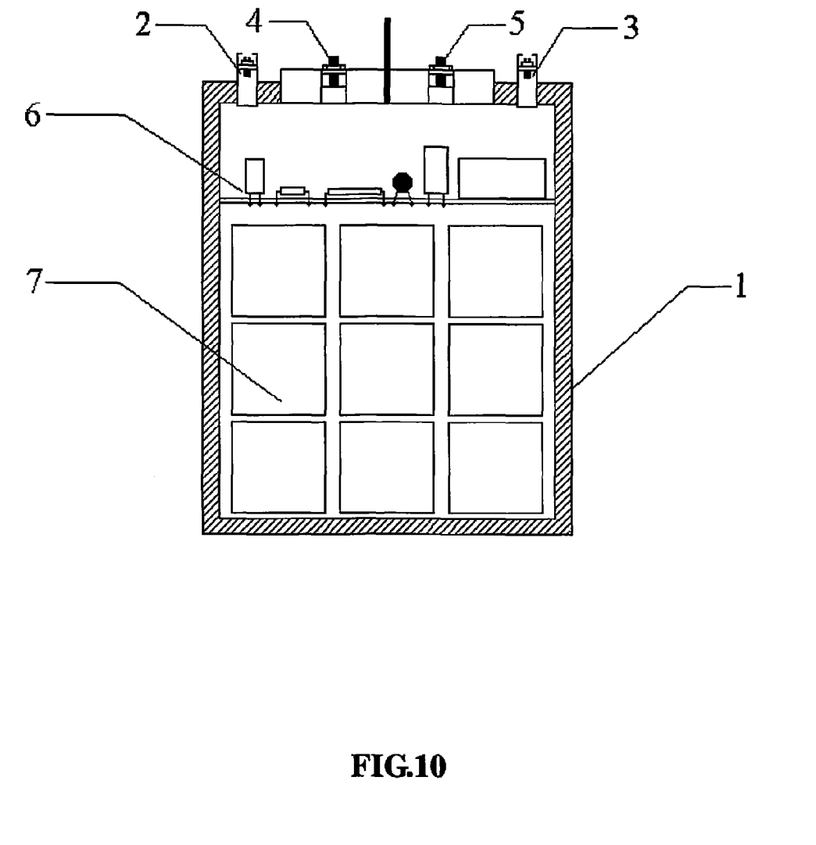
FIG. 10 is a structural diagram 2 showing internal of a capacitor unit of an intelligent switch of embodiments in the present disclosure.

The internal structure and appearance of the intelligent switch capacitor unit are as shown in FIG. 9 and FIG. 10. A plurality of capacitor core packages 7 in series are placed at a lower part of the cylindrical housing 1, the capacitor core package can adopt a dry type structure of a metalized film, namely the capacitor core package is winded by using the metalized film. The intelligent switch control module 6 (an intelligent switch control circuit board) is placed above the capacitor core packages 7. Capacitor paper or a polypropylene film insulation layer 8 can be used for insulation between the capacitor core packages and the housing. The capacitor core package can also adopt a whole film structure of a foil type structure of a traditional high-voltage capacitor, and insulating oil 9 is used for insulation between the capacitor core packages and the housing. The housing of the intelligent switch capacitor unit is functioned as a pole of the capacitor, and a capacitor end of the intelligent switch capacitor (a low-voltage end) can generally be connected to the housing.

Figure 11:
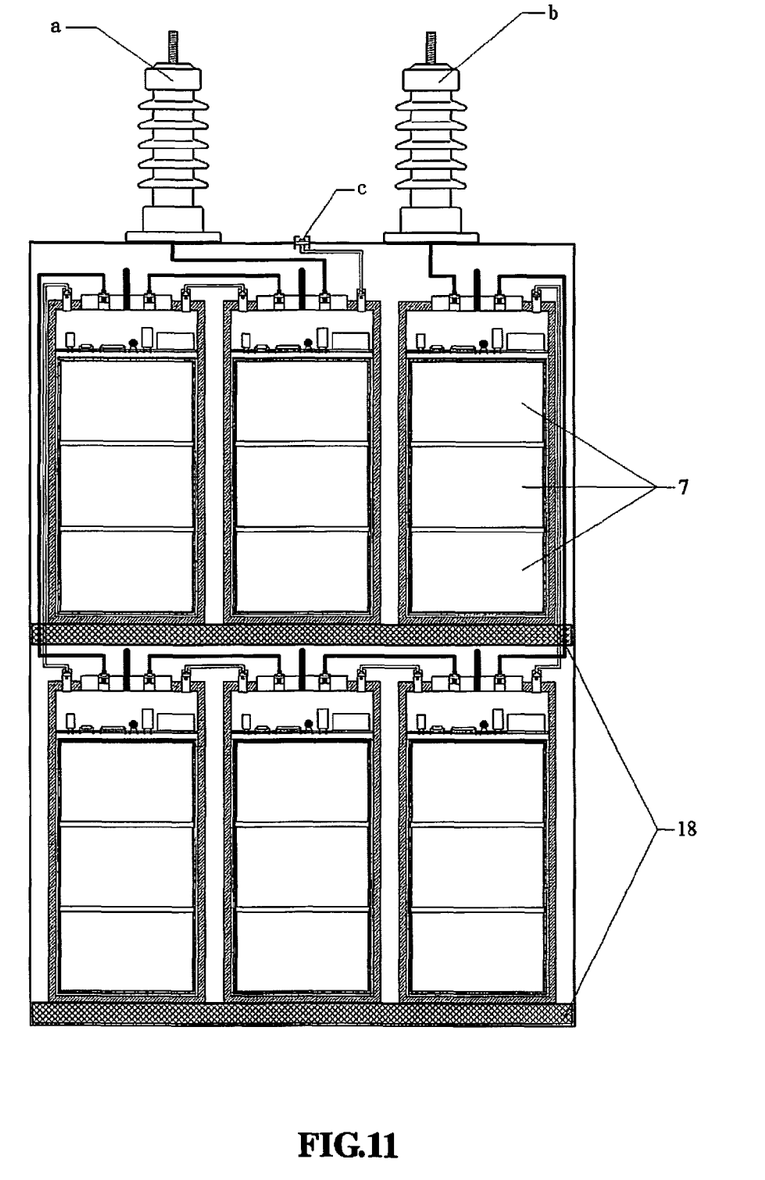
FIG. 11 is a structural diagram showing internal of a high-voltage intelligent switch AC capacitor of embodiments in the present disclosure.

The intelligent switch capacitor unit can also adopt a rectangular structure as shown in FIG. 11. A lower part of a square housing is placed with a plurality of capacitor core packages 7 in series or in parallel. The capacitor core package 7 can adopt a dry type structure of a metalized film, namely the capacitor core package is winded by using the metalized film. Capacitor paper or a polypropylene film insulation layer can be used for insulation between the capacitor core packages and the housing. The housing of the intelligent switch capacitor unit is functioned as a pole of the capacitor, and a capacitor end of the intelligent switch capacitor (a low-voltage end) can generally be connected to the housing.

Figure 12:
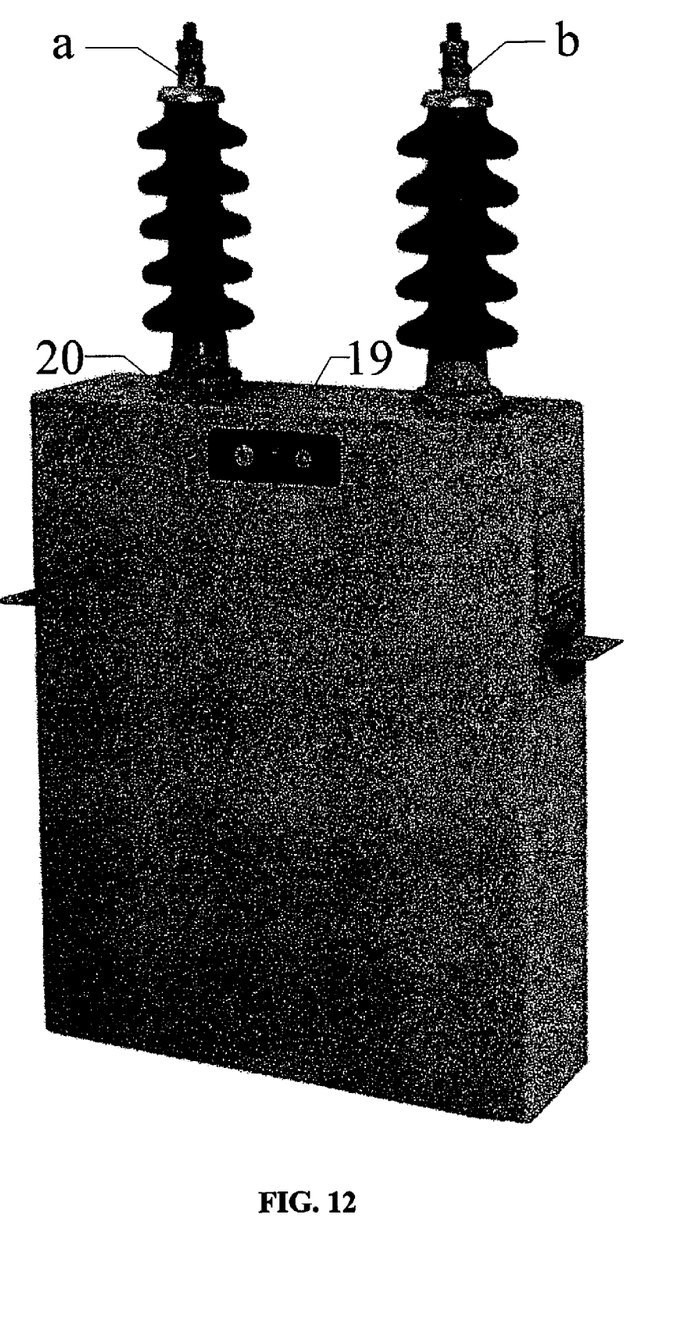
FIG. 12 is an outline diagram showing a high-voltage intelligent switch AC capacitor of embodiments in the present disclosure.

A high-voltage intelligent switch AC capacitor can be used in practice is formed after a plurality of intelligent switch capacitor units are connected in series and are connected to corresponding high and low voltage communication interfaces. As shown in FIG. 12, in order to facilitate installation and use, a plurality of intelligent switch capacitor units can be completely assembled and then placed into a housing as same as that of a traditional high-voltage AC capacitor.

The high-voltage intelligent switch AC capacitor as shown in FIG. 11 can be formed after six intelligent switch capacitor units as shown in FIG. 8 are connected in series and are correspondingly connected to high and low voltage communication interfaces. Capacity of the capacitor is 200 kvar, an operation voltage of the capacitor is 6 kV, and a volume of the capacitor is about 400*150*900 mm (L*D*H). Each intelligent switch capacitor unit is fixed by using an insulation support board 18. Insulation measures are taken between housings to ensure there is no discharge between the housings. The housing of the high-voltage intelligent switch AC capacitor is installed on a compensation device and is generally grounded. Therefore, enough insulation measures should be taken between a capacitor unit and the housing of the high-voltage intelligent switch AC capacitor in order to prevent discharging between a housing of the capacitor unit and the housing of the high-voltage intelligent switch AC capacitor. Ordinary skilled persons in the field of high voltage can adopt a plurality of modes to achieve specific insulation measures, which are not illustrated one by one in the present application. The signal control end c of the high-voltage intelligent switch AC capacitor can be educed not only through a control terminal, but also through an infrared emitting diode and infrared receiver.

There is almost no difference between appearances of the high-voltage intelligent switch AC capacitor of the present disclosure and an existing high-voltage capacitor, and the high-voltage intelligent switch AC capacitor of the present disclosure is more convenient for use. In a structure of the high-voltage intelligent switch AC capacitor as shown in FIG. 12, the control end c can be composed of an infrared receiver 19 and an infrared emitting diode 20. It is safer and more convenient to use infrared signals to control the high-voltage intelligent switch AC capacitor of the present disclosure. As for the high-voltage intelligent switch capacitor of the present disclosure, the high-voltage fling-cut switch is integrated into interior of the capacitor, so there is no need to connect the high-voltage switch and the capacitor during installation and use, so that not only installation cost is greatly reduced, but also hidden danger of installation is reduced.

In an aspect of function, the high-voltage intelligent switch capacitor of the present disclosure has many protective measures. Temperature sensors 14 are placed inside the capacitor, and can provide more accurate capacitor operating temperature information compared to a peripheral temperature sensor, so that the capacitor can be protected more timely and accurately. A current detection module 15 can provide information about magnitude of a current passes through the capacitor and a harmonic wave. If the current (harmonic current) passing through the capacitor is too large or a resonance occurs, the switch can be turned off to protect the capacitor. A voltage detection module 16 provides operation voltage information of the capacitor. Capacity of a thin film metalized capacitor continuously reduces in use. As to the capacitor core packages in series, when capacity attenuation deviation of each core package is large, eventually resulting in breakdown of the whole capacitor. Therefore it is a best protection mode for the thin film metalized capacitor to early detect voltage imbalance of the capacitor core packages. Obviously, detection of voltage of core packages inside the capacitor can make metalized film technologies be reliably applied to the high-voltage capacitor.

What is claimed is:

1. A high-voltage intelligent switch alternating current (AC) capacitor, comprising a high-voltage intelligent switch and a high-voltage AC capacitor, wherein the high-voltage intelligent switch and the high-voltage AC capacitor are formed of a plurality of intelligent switch capacitor units connected in series, and have a control end for controlling the high-voltage intelligent switch; each of the plurality of intelligent switch capacitor units comprises an intelligent switch control module, a relay switch, and an AC capacitor, wherein contacts of the relay switch are connected with the AC capacitor in series, and the intelligent switch control module is connected to both ends of a series circuit of the contacts of the relay switch and the AC capacitor.

2. The high-voltage intelligent switch AC capacitor according to claim 1, wherein the intelligent switch control module is composed of a power supply module, an intelligent switch control circuit, a switch contact protection circuit, a low-voltage end communication module, a high-voltage end communication module, a temperature sensor, a current detection module, a voltage detection module and a capacitor discharging module.

3. The high-voltage intelligent switch AC capacitor according to claim 2, wherein the power supply module is a capacitance step-down rectification voltage stabilizing power supply.

4. The high-voltage intelligent switch AC capacitor according to claim 1, wherein the relay switch in each of the plurality of intelligent switch capacitor units is a magnetic latching relay switch.

5. The high-voltage intelligent switch AC capacitor according to claim 1, wherein after a control port of the high-voltage intelligent switch AC capacitor receives a switch-on instruction, the switch-on instruction will be transmitted to the plurality of intelligent switch capacitor units through the high-voltage end communication module and low-voltage end communication module in each of the plurality of intelligent switch capacitor units and switches of the plurality of intelligent switch capacitor units are turned on at a same time; and when the control port receives a switch-off instruction, switches of the plurality of intelligent switch capacitor units are turned off at a same time.

6. The high-voltage intelligent switch AC capacitor according to claim 1, wherein a temperature sensor is arranged in each of the plurality intelligent switch capacitor units, and is configured to detect temperature of capacitor core packages; a current detector is provided in each of the plurality of intelligent switch capacitor units and is configured to detect current passing through the AC capacitor and harmonic components during operating of the AC capacitor; and a voltage detection module is arranged in each of the plurality of intelligent switch units and is configured to detect operation voltage during operating of the AC capacitor; when one or more of the plurality of intelligent switch capacitor units detects that a temperature, current or voltage exceeds a set value, switches of the plurality of intelligent switch capacitor unit are notified through the high and low voltage communication modules to be turned off at a same time, so as to protect the AC capacitor in each of the plurality of the intelligent switch capacitor units.

7. The high-voltage intelligent switch AC capacitor according to claim 1, wherein both ends of each of the intelligent switch capacitor unit are connected to relay contacts in parallel, and the parallel relay is controlled by an intelligent switch control module of the each of the plurality of intelligent switch capacitor units; a contact circuit of the parallel relay is provided with a current mutual inductor, and when the parallel relay contacts short out the each of the plurality of intelligent switch capacitor units, the current mutual inductor provides power to the intelligent switch control module of the each of the plurality of intelligent switch capacitor units.

8. The high-voltage intelligent switch AC capacitor according to claim 1, wherein the AC capacitor in each of the plurality intelligent switch capacitor units is composed of a plurality of thin film metalized capacitor core packages connected in serial or in parallel.

9. The high-voltage intelligent switch AC capacitor according to claim 1, wherein each of the plurality of intelligent switch capacitor units has a metal housing, which is functioned as a pole of the each of the plurality of intelligent switch capacitor units.

10. The high-voltage intelligent switch AC capacitor according to claim 2, wherein the relay switch in each of the plurality of intelligent switch capacitor units is a magnetic latching relay switch.

11. The high-voltage intelligent switch AC capacitor according to claim 2, wherein after a control port of the high-voltage intelligent switch AC capacitor receives a switch-on instruction, the switch-on instruction will be transmitted to the plurality of intelligent switch capacitor units through the high-voltage end communication module and low-voltage end communication module in each of the plurality of intelligent switch capacitor units, and switches of the plurality of intelligent switch capacitor units are turned on at a same time; and when the control port receives a switch-off instruction, switches of the plurality of intelligent switch capacitor units are turned off at a same time.

12. The high-voltage intelligent switch AC capacitor according to claim 3, wherein after a control port of the high-voltage intelligent switch AC capacitor receives a switch-on instruction, the switch-on instruction will be transmitted to the plurality of intelligent switch capacitor units through the high-voltage end communication module and low-voltage end communication module in each of the plurality of intelligent switch capacitor units, and switches of all the plurality of intelligent switch capacitor units are turned on at a same time; and when the control port receives a switch-off instruction, switches of the plurality of intelligent switch capacitor units are turned off at a same time.

13. The high-voltage intelligent switch AC capacitor according to claim 4, wherein after a control port of the high-voltage intelligent switch AC capacitor receives a switch-on instruction, the switch-on instruction will be transmitted to the plurality of intelligent switch capacitor units through the high-voltage end communication module and low-voltage end communication module in each of the plurality of intelligent switch capacitor units, and switches of the plurality of intelligent switch capacitor units are turned on at a same time; and when the control port receives a switch-off instruction, switches of the intelligent switch capacitor units are turned off at a same time.

14. The high-voltage intelligent switch AC capacitor according to claim 2, wherein a temperature sensor is arranged in each of the plurality of intelligent switch capacitor units, and is configured to detect temperature of capacitor core packages; a current detector is provided in each of the plurality of intelligent switch capacitor unit, and is configured to detect current passing through the AC capacitor and harmonic components during operating of the AC capacitor; and a voltage detection module is arranged in each of the intelligent switch units, and is configured to detect operation voltage during operating of the AC capacitor; when one or more of the plurality of intelligent switch capacitor unit detects that a temperature, current or voltage exceeds a set value, switches of the plurality of the intelligent switch capacitor unit are notified through the high and low voltage communication modules to be turned off at a same time, so as to protect the AC capacitor in each of the plurality of the intelligent switch capacitor units.

15. The high-voltage intelligent switch AC capacitor according to claim 3, wherein a temperature sensor is arranged in each of the plurality of intelligent switch capacitor unit, and is configured to detect temperature of capacitor core packages; a current detector is provided in each of the plurality of intelligent switch capacitor units, and is configured to detect current passing through the capacitor and harmonic components during operating of the AC capacitor; and a voltage detection module is arranged in each of the plurality of intelligent switch unit, and is configured to detect operation voltage during operating of the AC capacitor; when one or more of the plurality of intelligent switch capacitor units detects that a temperature, current or voltage exceeds a set value, switches of all the intelligent switch capacitor unit are notified through the high and low voltage communication modules to be turned off at a same time, so as to protect the capacitor in each of the plurality of the intelligent switch capacitor units.

16. The high-voltage intelligent switch AC capacitor according to claim 4, wherein a temperature sensor is arranged in each of the plurality of intelligent switch capacitor units, and is configured to detect temperature of capacitor core packages; a current detector is provided in each of the plurality of intelligent switch capacitor units, and is configured to detect current passing through the AC capacitor and harmonic components during operating of the AC capacitor; and a voltage detection module is arranged in each of the plurality of intelligent switch unit, and is configured to detect operation voltage during operating of the capacitor; when one or more of the plurality of intelligent switch capacitor unit detects that a temperature, current or voltage exceeds a set value, switches of the plurality of intelligent switch capacitor units are notified through the high and low voltage communication modules to be turned off at a same time, so as to protect the AC capacitor in each of the plurality of the intelligent switch capacitor units.

17. The high-voltage intelligent switch AC capacitor according to claim 5, wherein a temperature sensor is arranged in each of the plurality of intelligent switch capacitor units, and is configured to detect temperature of capacitor core packages; a current detector is provided in each of the plurality of intelligent switch capacitor units, and is configured to detect current passing through the AC capacitor and harmonic components during operating of the AC capacitor; and a voltage detection module is arranged in each of the plurality of intelligent switch unit, and is configured to detect operation voltage during operating of the capacitor; when one or more of the plurality of intelligent switch capacitor unit detects that a temperature, current or voltage exceeds a set value, switches of the plurality of intelligent switch capacitor unit are notified through the high and low voltage communication modules to be turned off at a same time, so as to protect the AC capacitor in each of the plurality of the intelligent switch capacitor units.

18. The high-voltage intelligent switch AC capacitor according to claim 2, wherein both ends of each of the intelligent switch capacitor unit are connected to relay contacts in parallel, and the parallel relay is controlled by an intelligent switch control module of the each of the plurality of intelligent switch capacitor units; a contact circuit of the parallel relay is provided with a current mutual inductor, and when the parallel relay contacts short out the each of the plurality of intelligent switch capacitor units, the current mutual inductor provides power to the intelligent switch control module of the each of the plurality of intelligent switch capacitor units.

19. The high-voltage intelligent switch AC capacitor according to claim 3, wherein both ends of each of the intelligent switch capacitor units are connected to relay contacts in parallel, and the parallel relay is controlled by an intelligent switch control module of the each of the plurality of intelligent switch capacitor units; a contact circuit of the parallel relay is provided with a current mutual inductor, and when the parallel relay contacts short out the each of the plurality of intelligent switch capacitor units, the current mutual inductor provides power to the intelligent switch control module of the each of the plurality of intelligent switch capacitor units.

20. The high-voltage intelligent switch AC capacitor according to claim 4, wherein both ends of each of the intelligent switch capacitor units are connected to relay contacts in parallel, and the parallel relay is controlled by an intelligent switch control module of the each of the plurality of intelligent switch capacitor units; a contact circuit of the parallel relay is provided with a current mutual inductor, and when the parallel relay contacts short out the each of the plurality of intelligent switch capacitor units, the current mutual inductor provides power to the intelligent switch control module of the each of the plurality of intelligent switch capacitor units.

* * * * *